United States Patent
Schober et al.

(10) Patent No.: US 10,212,724 B2
(45) Date of Patent: Feb. 19, 2019

(54) ENHANCED LINK ADAPTATRION

(71) Applicant: Nokia Technologies Oy, Espoo (FI)

(72) Inventors: Karol Schober, Helsinki (FI); Mikko Kokkonen, Helsinki (FI); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 72 days.

(21) Appl. No.: 15/005,358

(22) Filed: Jan. 25, 2016

(65) Prior Publication Data
US 2016/0227559 A1    Aug. 4, 2016

Related U.S. Application Data

(60) Provisional application No. 62/109,990, filed on Jan. 30, 2015.

(51) Int. Cl.
| | | |
|---|---|---|
| *H04W 72/12* | (2009.01) | |
| *H04W 72/08* | (2009.01) | |
| *H04W 72/04* | (2009.01) | |
| *H04L 5/00* | (2006.01) | |
| *H04B 7/04* | (2017.01) | |
| *H04B 7/06* | (2006.01) | |
| *H04B 7/0452* | (2017.01) | |

(Continued)

(52) U.S. Cl.
CPC ...... *H04W 72/1231* (2013.01); *H04B 7/0452* (2013.01); *H04B 7/0621* (2013.01); *H04J 11/004* (2013.01); *H04L 5/006* (2013.01); *H04L 5/0094* (2013.01); *H04W 72/042* (2013.01); *H04W 72/0446* (2013.01); *H04W 72/082* (2013.01); *H04L 1/1822* (2013.01)

(58) Field of Classification Search
CPC ......... H04W 72/1231; H04W 72/0446; H04W 72/042; H04W 72/082; H04L 5/006; H04L 5/0094
See application file for complete search history.

(56) References Cited

U.S. PATENT DOCUMENTS

| | | | |
|---|---|---|---|
| 2013/0287150 A1* | 10/2013 | Jung | H04L 5/0023 375/341 |
| 2014/0233407 A1 | 8/2014 | Pourahmadi et al. | |

(Continued)

FOREIGN PATENT DOCUMENTS

| | | |
|---|---|---|
| EP | 2439999 A2 | 4/2012 |
| WO | 2010/147882 A2 | 12/2010 |
| WO | 2015/005609 A1 | 1/2015 |

OTHER PUBLICATIONS

Office Action received for corresponding European Patent Application No. 16152860.9, dated Apr. 12, 2017, 5 pages.

(Continued)

*Primary Examiner* — Gbemileke J Onamuti
(74) *Attorney, Agent, or Firm* — Squire Patton Boggs (US) LLP

(57) ABSTRACT

Systems, methods, apparatuses, and computer program products for enhanced link adaptation are provided. One method includes receiving, by a network node, channel state information (CSI) feedback from at least one user equipment (UE), scheduling the same UEs in one rank or more than one rank in the same subframe, and scheduling multiple UEs on at least one same time-frequency resource.

20 Claims, 6 Drawing Sheets

(51) Int. Cl.
*H04J 11/00* (2006.01)
*H04L 1/18* (2006.01)

(56) References Cited

U.S. PATENT DOCUMENTS

| | | | | |
|---|---|---|---|---|
| 2015/0124724 A1* | 5/2015 | Yang | ............ | H04L 5/0028 370/329 |
| 2015/0381422 A1* | 12/2015 | Eriksson | ............ | H04B 7/2656 370/277 |
| 2016/0316389 A1* | 10/2016 | Kim | ............ | H04B 17/345 |

OTHER PUBLICATIONS

Extended European Search Report received for corresponding European Patent Application No. 16152860.9, dated Jun. 2, 2016, 8 pages.
Communication pursuant to Article 94(3) EPC dated Nov. 7, 2017 corresponding to European Patent Application No. 16 152 860.9.
Samsung, "UE feedback and scheduling considerations for 4-Tx antenna MIMO," 3GPP Draft; R1-063566, 3GPP TSG RAN WG1 Meeting #47, Riga, Latvia, Nov. 6-10, 2016, Nov. 10, 2006, XP050103997.

* cited by examiner

ENHANCED LINK ADAPTATRION

CROSS-REFERENCE TO RELATED APPLICATIONS

This application claims priority from U.S. Application No. 62/109,990, filed on Jan. 30, 2015. The entire contents of this earlier filed application are hereby incorporated by reference in their entirety.

BACKGROUND

Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) and downlink peak rates of at least, for example, 300 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A is carrier aggregation, which allows for increasing the data rates through aggregation of two or more LTE carriers.

SUMMARY

One embodiment is directed to a method that may include receiving, by a network node, CSI feedback from at least one UE. The method may also include scheduling the at least one UE in one or more than one ranks (e.g., in both rank 1 and higher rank) in a subframe, and scheduling multiple UEs on at least one time-frequency resource. The method may further include semi-statically or dynamically signaling to the at least one UE information relating the blind detection needed for serving and co-scheduled interference PDSCH detection. In one embodiment, the signaling may include dynamically or semi-statically signaling to the at least one UE information relating to a total number of layers (serving and/or interference). According to another embodiment, the signaling may include dynamically or semi-statically signaling to the at least one UE information relating to utilized DMRS configuration for serving transmission. In this embodiment, the signaling may include signaling the exact or a subset of DMRS configuration used for co-scheduled transmission.

Another embodiment is directed to an apparatus, which may include at least one processor and at least one memory including computer program code. The at least one memory and computer program code may be configured, with the at least one processor, to cause the apparatus at least to receive CSI feedback from at least one UE, schedule the at least one UE in one or more than one ranks (e.g., in both rank 1 and higher rank) in a subframe, and schedule multiple UEs on at least one time-frequency resource. According to an embodiment, the at least one memory and computer program code are also configured, with the at least one processor, to cause the apparatus at least to semi-statically or dynamically signal to the at least one UE information relating the blind detection needed for serving and co-scheduled interference PDSCH detection.

In one embodiment, the signaling may include dynamically or semi-statically signaling to the at least one UE information relating to a total number of layers (serving and/or interference). According to another embodiment, the signaling may include dynamically or semi-statically signaling to the at least one UE information relating to utilized DMRS configuration for serving transmission. In this embodiment, the signaling may include signaling the exact or a subset of DMRS configuration used for co-scheduled transmission.

Another embodiment is directed to an apparatus that may include receiving means for receiving CSI feedback from at least one UE. The apparatus may also include scheduling means for scheduling the at least one UE in one or more than one ranks (e.g., in both rank 1 and higher rank) in a subframe, and for scheduling multiple UEs on at least one time-frequency resource. The apparatus may further include signaling means for semi-statically or dynamically signaling to the at least one UE information relating the blind detection needed for serving and co-scheduled interference PDSCH detection.

In one embodiment, the signaling means may include means for dynamically or semi-statically signaling to the at least one UE information relating to a total number of layers (serving and/or interference). According to another embodiment, the signaling means may include means for dynamically or semi-statically signaling to the at least one UE information relating to utilized DMRS configuration for serving transmission. In this embodiment, the signaling means may include means for signaling the exact or a subset of DMRS configuration used for co-scheduled transmission.

Another embodiment is directed to a computer program embodied on a non-transitory computer readable medium. The computer program may be configured to control a processor to perform a process that may include receiving CSI feedback from at least one UE. The process may also include scheduling the at least one UE in one or more than one ranks (e.g., in both rank 1 and higher rank) in a subframe, and scheduling multiple UEs on at least one time-frequency resources. The process may further include semi-statically or dynamically signaling to the at least one UE information relating the blind detection needed for serving and co-scheduled interference PDSCH detection.

In one embodiment, the signaling may include dynamically or semi-statically signaling to the at least one UE information relating to a total number of layers (serving and/or interference). According to another embodiment, the signaling may include dynamically or semi-statically signaling to the at least one UE information relating to utilized DMRS configuration for serving transmission. In this embodiment, the signaling may include signaling the exact or a subset of DMRS configuration used for co-scheduled transmission.

Another embodiment may be directed to a method that may include reporting to a network node, by a UE, CSI feedback. For example, the CSI feedback may include a CSI that maximizes throughput at the UE. The method may further include receiving at least one of scheduling of the user equipment in one or more than one rank in a subframe or scheduling of the user equipment at least one same time-frequency resource as scheduled to another user equipment.

The method may also include receiving network assistance with respect to interference properties due to co-scheduled UEs. The method may also include receiving dynamic signaling indicating at least one of serving and interference properties.

In one embodiment, when the interferer is in CRS mode, the network assistance may include: codebook subset restriction indicating an active UE in the cell is utilizing PMI from signaled subset of PMIs, PA subset (of used PAs within subframe layer), transmission scheme/mode or subset. According to an embodiment, when the interferer is in DMRS mode, the network assistance may include a subset of DMRS configurations used by the network node (e.g., eNB), virtual cell ID, quasi-collocation information, transmission scheme/mode.

According to one embodiment, when the interferer is in CRS mode, the dynamic signaling may include the exact wideband PMI of serving transmission with an indication which column of PMI corresponds to layer to be blindly detected. In an embodiment, when interferer is in DMRS mode, the dynamic signaling may include allocated DMRS configuration(s) including indication on which DMRS configuration(s) the UE will detect presence of layers targeted for blind detection.

Another embodiment is directed to an apparatus, which may include at least one processor and at least one memory including computer program code. The at least one memory and computer program code may be configured, with the at least one processor, to cause the apparatus at least to report to a network node CSI feedback. For example, the CSI feedback may include CSI that maximizes throughput at the apparatus. The at least one memory and computer program code may also be configured, with the at least one processor, to cause the apparatus at least to receive at least one of scheduling of the user equipment in one or more than one rank in a subframe or scheduling of the user equipment at least one same time-frequency resource as scheduled to another user equipment.

The at least one memory and computer program code may be further configured, with the at least one processor, to cause the apparatus at least to receive network assistance with respect to interference properties due to co-scheduled UEs, and receive dynamic signaling indicating at least one of serving and interfering properties.

Another embodiment is directed to an apparatus that may include reporting means for reporting, to a network node, CSI feedback, and receiving means for receiving scheduling of the user equipment in one or more than one rank in a same subframe and for receiving scheduling of the user equipment at least one same time-frequency resource as scheduled to another user equipment.

Another embodiment is directed to a computer program embodied on a non-transitory computer readable medium. The computer program may be configured to control a processor to perform a process that may include reporting to a network node, by a UE, CSI feedback, and receiving at least one of scheduling of the user equipment in one or more than one rank in a subframe or scheduling of the user equipment at least one same time-frequency resource as scheduled to another user equipment.

BRIEF DESCRIPTION OF THE DRAWINGS

For proper understanding of the invention, reference should be made to the accompanying drawings, wherein.

DETAILED DESCRIPTION

Figure 1:
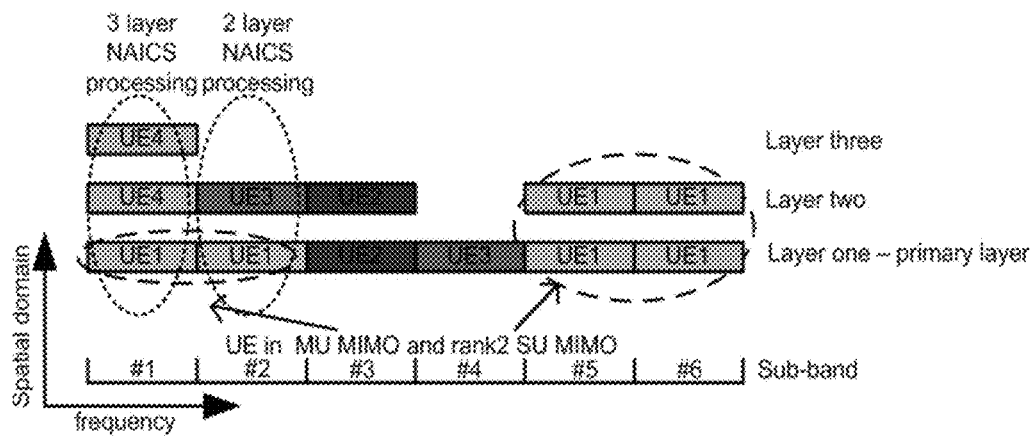
FIG. 1 illustrates an example of enhanced link adaptation based on the utilization of the advanced receiver, according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for enhanced link adaptation, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

In 3GPP Release 13, improvement of multi-user multiple input multiple output (MU-MIMO) in context of non-linear receivers will be discussed. Non-linear receivers such as Symbol Level interference cancellation (SLIC) or Reduced complexity maximum likelihood (RML) have been discussed extensively during 3GPP Release 12 network assisted interference cancellation and suppression (NAICS). Indeed, in 3GPP Release 12, the advanced receivers have been used in two important interference cancellation (IC) situations: inter-stream IC (single user (SU) MIMO) and inter-cell physical downlink shared channel (PDSCH) IC (so called NAICS). The utilization of non-linear receivers in 3GPP Release 13 and beyond introduces the opportunity for enhancing the link adaptation of the LTE system.

The current LTE system performs rank adaptation in a conservative way in the sense that one UE is scheduled with the same rank during a particular subframe. Such an approach has been motivated by several factors. First, the UE implementation based on linear receivers handling only one or two codewords per subframe was seen as a simpler implementation. Secondly, the control signaling is simpler. The DL frequency resource allocation signaling requires only per transmission allocation bitmap instead of per layer or codeword. In addition, the UE is indicated if it is scheduled in SU-MIMO (with a specific rank) or in MU-MIMO (with a specific rank).

Thus, the current state of technology involves the 3GPP Release 12 NAICS advanced non-linear receivers which are capable of performing inter-cell IC and blind detection of interfering eNB parameters, as well as of release 12 advanced non-linear receivers which are capable of performing inter-stream IC. Currently, rank adaptation is performed wideband per subframe.

However, a first hint that the above system operation can be further enhanced lies in the fact that dynamic switching of SU and MU MIMO has been shown beneficial to LTE. With the aid of non-linear receivers (with blind detection capabilities), such SU/MU MIMO operation can be performed in the same subframe, exploiting the latest UE state-of-the-art implementation as defined in 3GPP Release 12 and with minimal additional complexity.

Embodiments of the invention provide operation of both rank 1 and rank 2, for the same UE, in the same subframe. Such operation is facilitated by the utilization of non-linear advanced receivers. In addition, the UEs can be paired in MU MIMO as well.

The elements of enhanced link adaptation (frequency selective rank adaptation) based on non-linear receivers are: (1) CSI computation at the UE, which includes rank, precoding matrix indicator (PMI), channel quality indicator (CQI); (2) channel state information (CSI) feedback reporting—alternatively, CSI feedback derivation at eNB for TDD, hence based on uplink (UL) sounding; (3) eNB scheduling with enhanced link adaptation for non-linear receiver which includes: cell-specific reference signal (CRS) and demodulation reference signal (DMRS) operation (potential enhancement of DMRS operation), existing transmission modes (TMs), scheduling of the UE in the same subframe with SU with different ranks and/or SU & MU; and (4) eNB control signaling (dynamic and semi-static) of the configured transmission.

An embodiment of the invention exploits the ability of the advanced UE to handle IC of aggressor interfering layers. 3GPP Release 12 specifies the operation of advanced receiver over 3 layers and 1 dominant interferer cancellation, which means that the following combinations of <serving layers, interfering layers> are possible: <1,1>, <2,1>, <1,2>. Such operation may be extended to cover the case of 4 or more layers operation and multiple dominant interferer cancellation, which extends the above possibilities to the following examples: <1,1,1>, <1,1,1,1>, <2,2>, etc.

FIG. 1 illustrates an example of enhanced link adaptation based on the utilization of the advanced receiver, according to an embodiment. In one embodiment, the operation of the advanced link adaptation is based, in part, on the principle that an advanced UE is able to cancel both inter-stream and inter-user interference from an interfering layer perspective, there are similarities between an interfering layer addressed to the same UE and the interfering layer coming from a spatially multiplexed UE.

According to certain embodiments, at least the following operations are provided: (1) An advanced UE utilizing non-linear receiver is possible to be scheduled in both rank 1 and rank 2 in the same sub-frame; (2) An advanced receiver is performing inter-user IC, canceling interference coming from a different user scheduled on the same time-frequency resource; and (3) An advanced receiver is performing inter-stream IC.

In order to perform the above operations, according to an embodiment, the advanced UE may receive dynamic and semi-static signaling. This is used in addition to the blind detection operation capability of the advanced UE, which may be needed in the process of estimating the interfering PDSCH characteristics.

As introduced above, FIG. 1 illustrates an example operation of the per cell advanced link adaptation, according to an embodiment. In this example, the UEs may be operating according to the following. As illustrated in the example of FIG. 1, UE1 is an advanced UE capable of canceling both inter-stream and inter-user interference. In this example, UE1 may be scheduled in the primary layer in SU MIMO rank 2 and also, on selected sub-bands, in rank 1. When applying a secondary spatial layer scheduling, UE1 may be scheduled in MU mode with UE4 on a particular sub-band and with UE3 on a different sub-band. UE1 may perform inter-user IC on sub-bands #1 and 2 and inter-stream IC on sub-bands #5 and #6, thereby making use of the 3GPP Release 12 advanced receiver capability. In the example of FIG. 1, UE2 is simply scheduled in SU MIMO rank 2 on a particular sub-band (in this case sub-band #3). UE2 may or may not have advanced receiver capability. In the example of FIG. 1, UE3 may be scheduled in the primary layer on sub-band #4 while in a secondary layer on sub-bands #2. UE3 is capable of inter-user IC on sub-bands #2 where it is paired in MU domain. UE4 may be scheduled in the secondary layer in SU MIMO rank 2 mode while sharing also the same time-frequency resources with UE1. UE4 is capable of inter-stream IC and also of inter-user IC.

Certain embodiments may include several important signaling components. This includes, for example, dynamic control signaling (for example through DCI) indicating the UE's PDSCH characteristics. The dynamic signaling may be based on the framework of existing dual codeword signaling, such as DCI 2C for example. A dual codeword DCI contains the signaling fields as shown in Table 1 below.

In an embodiment, per codeword (CW) indications are preserved and, in certain embodiments, it is assumed that the UE is scheduled with the same MCS class in a spatial layer. In Table 1, the RB allocation indicates the UE allocations with at least one layer, however it does not indicate the number of spatial layers; hence, the UE needs to detect itself, per subband, the type of interference which can have one of the following forms: 1. Inter-user, 2. Inter-stream, 3. Inter-cell. The Aps field is utilized in indicating the UE reference signal port and scrambling identity. In one embodiment, the network can signal in the DCI the total SU+MU rank scheduled to the UE. The number of layers targeted to the UE in SU MIMO mode may be available from the number of configured CWs in the DCI. Thus, the total number of signaled layers gives the UE the opportunity to know the expected maximum number of layers to be canceled (MU-MIMO mode), remaining that the UE identifies, per sub-band, the actual number of layers which may be less than the total number of indicated layers. Alternatively, the UE may be signaled dynamically a set of DM-RS codes used for its own signal and for interfering signal, from which it can estimate max MIMO rank.

TABLE 1

| Field | Bits | Comment |
|---|---|---|
| CIF | 0 | Carrier indicator field |
| Resource allocation header | 1 | Indicates allocation type 0 or 1 (type 2 uses payload A, same as UL) |
| RB allocation | 25 | |
| TPC | 2 | Power control of PUCCH |
| DAI | 0 | Downlink Assignment Index, applies in TDD only - 2 bits |
| Hybrid ARQ process number | 3 | 3 for FDD, 4 for TDD |
| Aps, scrambling identity and layers | 3 | Used for initializing the sequence generation for UE specific reference signals |
| SRS | 0 | 0 or 1 bits. Only for TDD |
| MCS, transport block 1 | 5 | |
| New data indicator (1st TB) | 1 | Toggled for each new transport block |
| Redundancy version (1st TB) | 2 | |
| MCS, transport block 2 | 5 | |
| New data indicator (2nd TB) | 1 | Toggled for each new transport block |
| Redundancy version (2nd TB) | 2 | |
| Total information bits | 50 | |
| Payload size disambiguous | 0 | |
| Total Payload size | 50 | |
| RNTI/CRC | 16 | 16 bit RNTI implicitly encoded in CRC |
| Total | 66 | |

According to an embodiment, dynamic or semi-static network assistance may be needed for the blind detection process, especially for inter-user IC stage. In the following, an example of the particular operation of UE1, UE3 and UE4 (depicted in FIG. 1), which perform inter-user IC, is described.

Under CRS mode, in one example, UE1 receives signalling information on the allocated resources; hence, it knows the exact sub-bands where it has to operate both inter-stream and inter-user IC. The UE1 performs channel estimation on CRS over the full band. As it is indicated to be scheduled in rank 2, the UE1 knows that there are two CWs scheduled for itself but also knows, for example from max-rank signalling, that there is potential inter-user interference to cancel on allocated sub-bands.

According to an embodiment, for sub-band #1, the UE1 may identify the inter-user interference based on the blind detection (BD) mechanism specified in 3GPP Release 12. For example, on sub-band #1, the NAICS capable UE1 may perform multi-user interference presence blind detection which will indicate the presence of UE4. Further, UE1 may perform PMI, rank, modulation, and PDSCH layer power blind detection for UE4. As network assistance, the UE1 may receive from the eNB information on codebook subset restriction (CBSR), hence the blind PMI search will be performed from a reduced set of PMI choices to limit the UE blind detection complexity. This CBSR signalling can be sent over radio resource control (RRC) from the serving eNB to UE1. The UE1 may be signalled the $P_A$ utilized for the serving transmission and performs BD for $P_A$ characterizing the interferer. Alternatively, to allow more flexibility to power allocation, $P_A$ can be layer specific or if different $P_A$ is used on different sub-bands, a subset of $P_A$ corresponding to all used values is signalled. Afterwards, the UE1 may perform blind detection of modulation for the spatial layers of UE4. Once the effective channel and modulation of UE4 are available, UE1 may perform symbol-level interference cancellation (SLIC) or reduced complexity maximum likelihood (RML) on sub-band #1

For sub-band #2, UE1 may perform similar operation as on subband #1. The differences, however, may include that, because of a rank 1 co-scheduled UE3, the power split between the layers is different and the UE1 may need to blindly detect this information.

For sub-band #5 & #6 (as well as all allocated subbands), UE1 may receive signalling of the "precoding information" field as in DCI 2. Alternatively, UE1 may receive semi-statically signalled CBSR of PMIs exclusively scheduled to it or a 1 bit-confirmation that reported feedback has been employed for precoding at the transmitter. If this information is available, the UE1 can utilize this in the BD process and identify that the two layers are assigned to itself. In this situation, the UE1 may proceed with decoding the two layers as typically done in SU MIMO advanced receiver operation, according to 3GPP Release 12, for example.

In certain embodiments, the other UEs may operate in a similar manner to UE1 as described above.

In some embodiments, the following signalling may be needed for UE operation on CRS: (1) Total number of layers signaling (SU+MU); (2) Power offsets for the desired UE and interfering UE; (3) Precoding information for the desired layers; (4) CBSR for the paired layers, possibly in the form of semi-static signaling.

Figure 2:
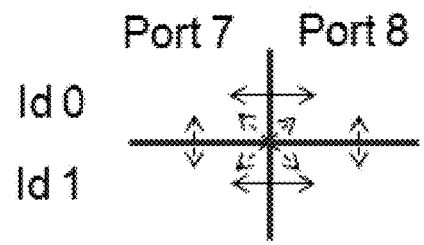
FIG. 2 illustrates an example of DMRS operation, according to an embodiment.

With respect to DMRS modes, one particularity of these modes is the simpler BD of the interfering layer. As in the case of CRS operation, for DMRS, the UE1 may receive signalling information on the allocated resources; hence, it knows the exact sub-bands where it has to operate. FIG. 2 illustrates an example of DMRS operation, according to an embodiment. In DMRS transmission modes, the following elements, as depicted in FIG. 2, may be used for creating orthogonal and quasi-orthogonal reference symbols: (1) Orthogonal ports 7 and 8 separated through CDM, and (2) Scrambling ID nSCID which create two quasi orthogonal choices in addition to the ports 7 and 8. With these two parameters, up to 4 quasi orthogonal DMRS ports can be used. These may be further scrambled with the virtual cell ID (VCID).

Figure 3:
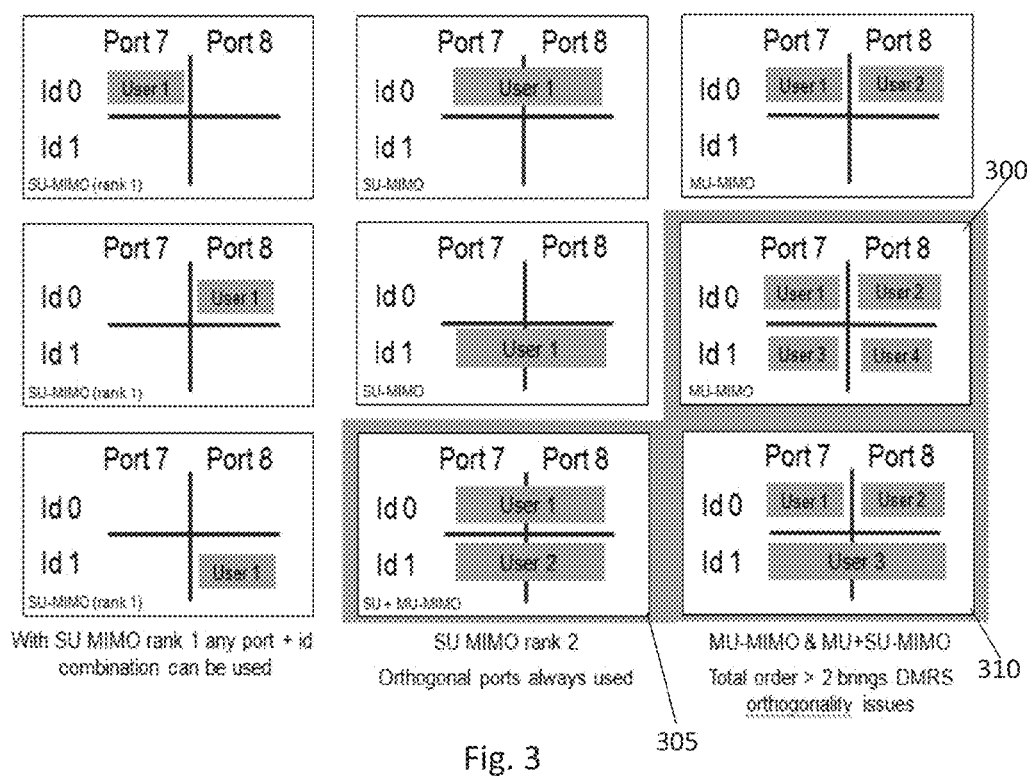
FIG. 3 illustrates an example of DMRS ports and scrambling IDs utilization for SU MIMO and MU MIMO, according to an embodiment.

FIG. 3 illustrates an example of DMRS ports and scrambling IDs utilization for SU MIMO and MU MIMO, according to an embodiment. Configurations 300, 305, 310 are possible configurations where the DMRS orthogonality is lost.

Figure 4:
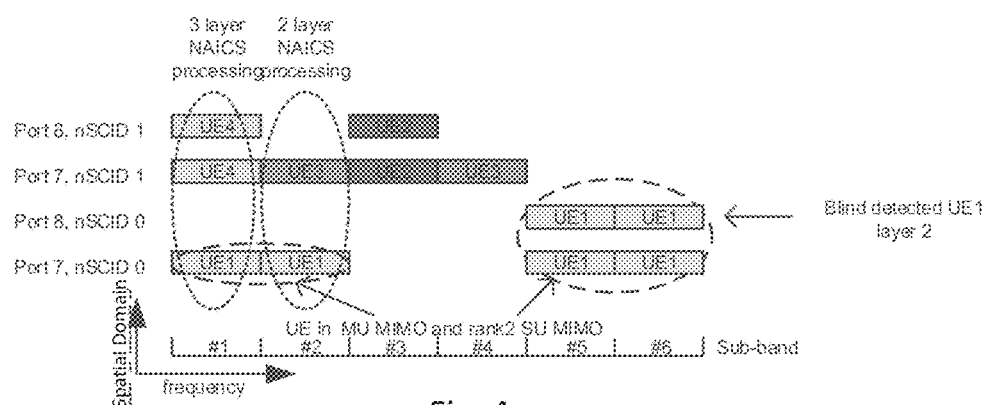
FIG. 4 illustrates a scheduling example, according to an embodiment.

FIG. 4 illustrates a scheduling example according to an embodiment. A priori, the UE1 would receive the indication of the <DMRS port, scrambling ID> utilized for its transmission. Such signalling is related to the SU MIMO operation, however a paired UE in MU mode may utilize on a particular sub-band a similar port and scrambling ID, for example UE1 gets signalled the pairs <port7, nSCID0> and <port8, nSCID0>. For instance, on sub-band #1 & #2, the combinations <port7, nSCID1> and <port8, nSCID1> is not utilized by UE1 and other UEs may use <port7, nSCID1> and/or <port8, nSCID1>, such as the case of UE4 and UE3.

In an embodiment, UE1 may perform the following operations on the respective sub-bands. For sub-band #1, in principle the UE1 BD mechanism would be able to detect the existence of use <port7, nSCID1> and <port8, nSCID1> corresponding to the UE4, hence its effective channel. Further, the UE1 may perform BD of modulation for UE4 and apply SLIC/RML or other IC receiver type. According to this embodiment, for sub-band #2, UE1 may perform similar operation as on subband #1. The only difference is that now UE3 is allocated at port <port7, nSCID1>. The performed IC is agnostic to which UE is scheduled on interfering layer. For sub-bands #5 & #6, UE1 knows that there is one layer dedicated to it on <port7, nSCID0>. It also knows that there might be a second layer dedicated to it on <port8, nSCID0>, and it performs, on each subband, presence detection of <port8, nSCID0>. The layer 2 targeted for blind detection may be scheduled with the stronger PMI. This will improve the success-rate of the BD.

Figure 5:
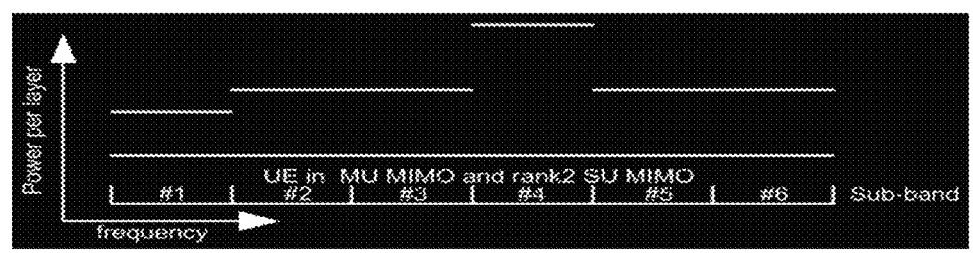
FIG. 5 illustrates an example of the power split per layer of the example in FIG. 4, according to an embodiment.

FIG. 5 illustrates an example of the power split per layer of the example in FIG. 4, i.e., the power allocations for single layer at each sub-band. In this example, the power is split between layers equally; however, embodiments of the invention are not limited to equal power sharing.

Figure 6A:
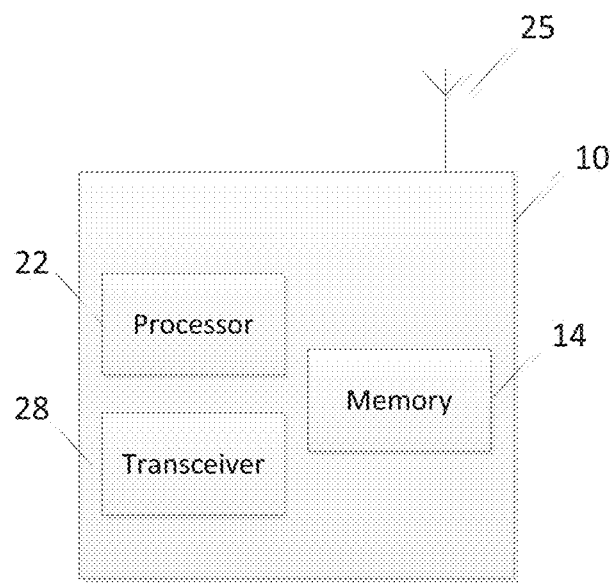
FIG. 6a illustrates a block diagram of an apparatus, according to one embodiment.

FIG. 6a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB, or an access node of 5G radio access technology. It should be noted that one of ordinary skill in the art would understand that apparatus 10 may include components or features not shown in FIG. 6a.

As illustrated in FIG. 6a, apparatus 10 includes a processor 22 for processing information and executing instructions or operations. Processor 22 may be any type of general or specific purpose processor. While a single processor 22 is shown in FIG. 6a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station, node B, or eNB, or an access node of 5G, for example. According to one embodiment, apparatus 10 may be controlled by memory 14 and processor 22 to receive CSI feedback from a UE, to schedule the same UEs in both rank 1 and higher rank in the same subframe, and to schedule multiple UEs on the same time-frequency resources.

In an embodiment, apparatus 10 may be further controlled by memory 14 and processor 22 to semi-statically signal, to the UE, information related to the blind detection needed for the serving and the co-scheduled interference PDSCH detection. According to one embodiment, apparatus 10 may be controlled by memory 14 and processor 22 to dynamically signal, to the UE, information related to the blind detection of the serving and the co-scheduled interfering PDSCH. For example, in one embodiment, apparatus 10 may be controlled by memory 14 and processor 22 to dynamically or semi-statically signal, to the UE, information related to the total number of layers (i.e., serving+interference). In another embodiment, apparatus 10 may be controlled by memory 14 and processor 22 to dynamically or semi-statically signal, to the UE, information related to the utilized DMRS configuration for the serving transmission. In certain embodiments, the exact or a subset of DMRS configuration used for co-scheduled transmission may be signaled to the UE.

Figure 6B:
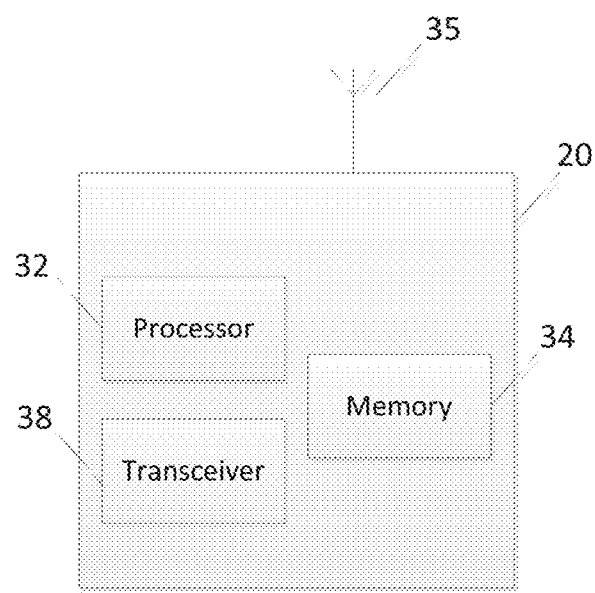
FIG. 6b illustrates a block diagram of an apparatus, according to another embodiment.

FIG. 6b illustrates an example of an apparatus 20 according to another embodiment. In an embodiment, apparatus 20 may be a node or element in a communications network or associated with such a network, such as a UE, mobile device, mobile unit, or other device. For instance, in some embodiments, apparatus 20 may be UE in LTE, LTE-A, or 5G. In certain embodiments, apparatus 20 may be a NAICS UE. It should be noted that one of ordinary skill in the art would understand that apparatus 20 may include components or features not shown in FIG. 6b.

As illustrated in FIG. 6b, apparatus 20 includes a processor 32 for processing information and executing instructions or operations. Processor 32 may be any type of general or specific purpose processor. While a single processor 32 is shown in FIG. 6b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE, and in some embodiments may be a NAICS UE. In this embodiment, apparatus 20 may be controlled by memory 34 and processor 32 to report CSI feedback which is maximizing the throughput as seen at apparatus 20. In an embodiment, apparatus 20 may be further controlled by memory 34 and processor 32 to receive semi-static network assistance with respect to the interference characteristics (e.g., due to co-scheduled UEs in MU MIMO). If the interferer is in CRS mode, the network assistance may include: (1) codebook subset restriction indicating the paired UE is utilizing the PMI from the signaled subset of PMIs; (2) PA subset, PA subset of used PAs within the subframe-layer, transmission scheme/mode or subset. If the interferer is in DMRS mode, the network assistance may include the subset of DMRS configurations used by the eNB, virtual cell ID, quasi-collocation information, transmission scheme/mode.

According to an embodiment, apparatus 20 may be controlled by memory 34 and processor 32 to receive dynamic signaling describing the serving and interfering characteristics. If the interferer is in CRS mode, the dynamic signaling may include the exact wideband PMI of serving transmission, with indication which column of PMI corresponds to layer to be blindly detected. If the interferer is in DMRS mode, the dynamic signaling may include the allocated DMRS configuration(s), including indication, on which DMRS-configuration(s) UE shall detect presence of the layer(s) targeted for blind detection. As an example, these can be in the form of <DMRS port, scrambling ID> indication.

Figure 7A:
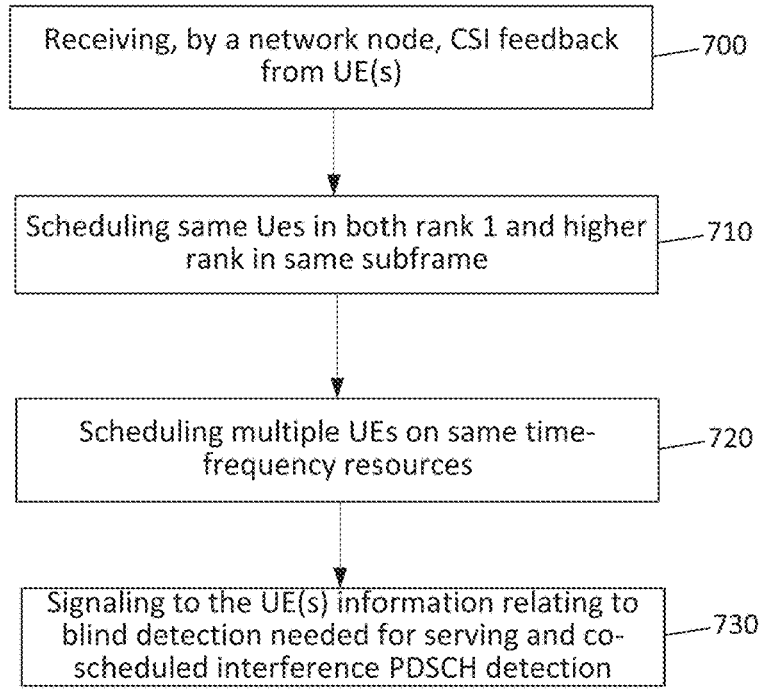
FIG. 7a illustrates a flow diagram of a method, according to one embodiment.

FIG. 7a illustrates an example flow diagram of a method according to one embodiment. In an embodiment, the method of FIG. 7a may be executed by a network node or access node, such as a base station or eNB. As illustrated in FIG. 7a, the method may include, at 700, receiving CSI feedback from at least one UE. At 710, the method may include scheduling the same UEs in both rank 1 and higher rank in the same subframe and, at 720, scheduling multiple UEs on the same time-frequency resources. The method may also include, at 730, semi-statically or dynamically signaling, to the at least one UE, information related to the blind detection needed for the serving and the co-scheduled interference PDSCH detection. For example, in one embodiment, the signaling may include dynamically or semi-statically signaling, to the UE, information related to the total number of layers (i.e., serving+interference). In another embodiment, the signaling may include dynamically or semi-statically signaling, to the UE, information related to the utilized DMRS configuration for the serving transmission. In certain embodiments, the exact or a subset of DMRS configuration used for co-scheduled transmission may be signaled to the UE.

Figure 7B:
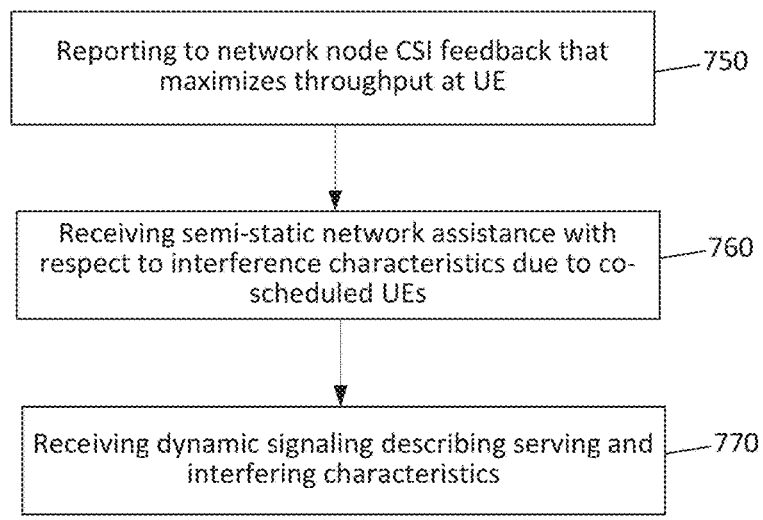
FIG. 7b illustrates a flow diagram of a method, according to another embodiment.

FIG. 7b illustrates an example flow diagram of a method according to another embodiment. In an embodiment, the method of FIG. 7b may be executed by a mobile device, such as a UE or NAICS UE. As illustrated in FIG. 7b, the method may include, at 750, reporting, to a network node, CSI feedback that maximizes the throughput as seen at the UE. In an embodiment, the method may further include, at 760, receiving semi-static network assistance with respect to the interference characteristics (e.g., due to co-scheduled UEs in MU MIMO). If the interferer is in CRS mode, the network assistance may include: (1) codebook subset restriction indicating the paired UE is utilizing the PMI from the signaled subset of PMIs; (2) PA subset, PA subset of used PAs within the subframe-layer), transmission scheme/mode or subset. If the interferer is in DMRS mode, the network assistance may include the subset of DMRS configurations used by the eNB, virtual cell ID, quasi-collocation information, transmission scheme/mode.

According to an embodiment, the method may further include, at 770, receiving dynamic signaling describing the serving and interfering characteristics. If the interferer is in CRS mode, the dynamic signaling may include the exact wideband PMI of serving transmission, with indication which column of PMI corresponds to layer to be blindly detected. If the interferer is in DMRS mode, the dynamic signaling may include the allocated DMRS configuration(s), including indication, on which DMRS-configuration(s) UE shall detect presence of the layer(s) targeted for blind detection. As an example, these can be in the form of <DMRS port, scrambling ID> indication.

Figure 8A:
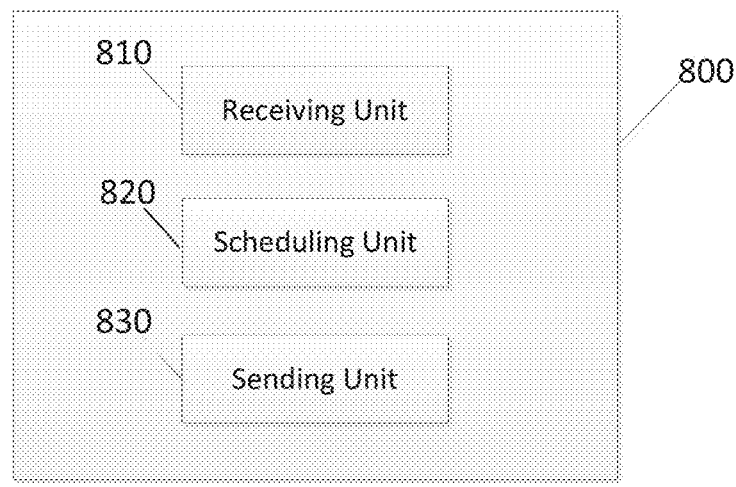
FIG. 8a illustrates a block diagram of an apparatus, according to one embodiment.

FIG. 8*a* illustrates a block diagram of an apparatus 800 according to an embodiment of the invention. In this embodiment, apparatus 800 may be a network node, such as a base or access station, node B, or eNB. As illustrated in FIG. 8*a*, apparatus 800 may include a receiving unit or means 810, a scheduling unit or means 820, and a sending unit or means 830. In an embodiment, receiving unit or means 810 may receive CSI feedback from a UE. According to one embodiment, scheduling unit or means 820 may schedule the same UEs in both rank 1 and higher rank in the same subframe, and schedule multiple UEs on the same time-frequency resources.

In certain embodiments, sending unit or means 830 may semi-statically signal, to the UE, information related to the blind detection needed for the serving and the co-scheduled interference PDSCH detection. According to one embodiment, sending unit or means 830 may dynamically signal, to the UE, information related to the blind detection of the serving and the co-scheduled interfering PDSCH. For example, in one embodiment, sending unit or means 830 may dynamically or semi-statically signal, to the UE, information related to the total number of layers (i.e., serving+interference). In another embodiment, sending unit or means 830 may dynamically or semi-statically signal, to the UE, information related to the utilized DMRS configuration for the serving transmission. In certain embodiments, the exact or a subset of DMRS configuration used for co-scheduled transmission may be signaled to the UE.

Figure 8B:
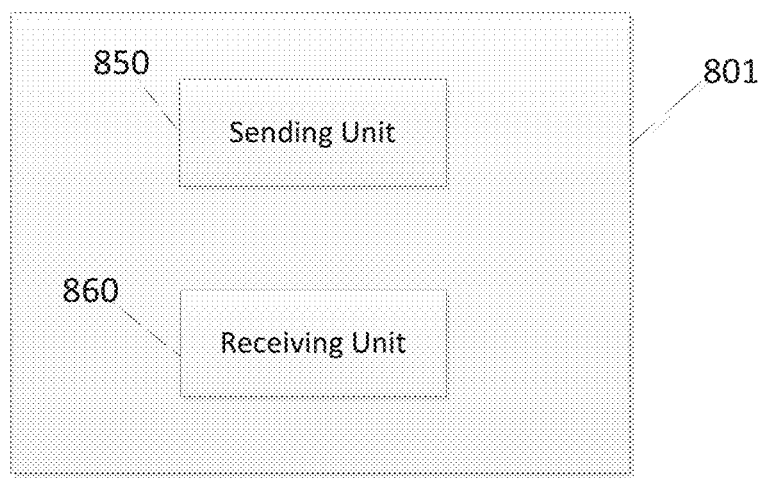
FIG. 8b illustrates a block diagram of an apparatus, according to another embodiment.

FIG. 8*b* illustrates a block diagram of an apparatus 801 according to an embodiment of the invention. In this embodiment, apparatus 801 may be a mobile device, such as a UE (e.g., NAICS UE). As illustrated in FIG. 8*b*, apparatus 801 may include a sending unit or means 850 and a receiving unit or means 860. According to an embodiment, sending unit or means 850 may report CSI feedback that maximizes the throughput at apparatus 801. In an embodiment, receiving unit or means 860 may receive semi-static network assistance with respect to the interference characteristics (e.g., due to co-scheduled UEs in MU MIMO). If the interferer is in CRS mode, the network assistance may include: (1) codebook subset restriction indicating the paired UE is utilizing the PMI from the signaled subset of PMIs; (2) PA subset, PA subset of used PAs within the subframe-layer, transmission scheme/mode or subset. If the interferer is in DMRS mode, the network assistance may include the subset of DMRS configurations used by the eNB, virtual cell ID, quasi-collocation information, transmission scheme/mode.

According to an embodiment, receiving unit or means 860 may receive dynamic signaling describing the serving and interfering characteristics. If the interferer is in CRS mode, the dynamic signaling may include the exact wideband PMI of serving transmission, with indication which column of PMI corresponds to layer to be blindly detected. If the interferer is in DMRS mode, the dynamic signaling may include the allocated DMRS configuration(s), including indication, on which DMRS-configuration(s) UE shall detect presence of the layer(s) targeted for blind detection. As an example, these can be in the form of <DMRS port, scrambling ID> indication.

In some embodiments, the functionality of any of the methods described herein, such as those illustrated in FIGS. 7*a* and 7*b* discussed above, may be implemented by software and/or computer program code or portions of it stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as singlechip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory including computer program code,
   wherein the at least one memory and computer program code are configured, with the at least one processor, to cause the apparatus at least to
   receive channel state information (CSI) feedback from at least one user equipment (UE);
   schedule the at least one UE in more than one ranks in a subframe; and
   schedule multiple UEs on at least one time-frequency resource with multiple spatial layers, wherein
   each of the multiple UEs is scheduled on a different spatial layer of the multiple spatial layers, and
   the at least one UE of the multiple UEs is scheduled on more than one spatial layer of the multiple spatial layers.

2. The apparatus according to claim 1, wherein the at least one memory and the computer program code are configured, with the at least one processor, to cause the apparatus at least to semi-statically or dynamically signal, to the at least one UE, information relating to blind detection needed for serving and co-scheduled interference physical downlink shared channel (PDSCH) detection.

3. The apparatus according to claim 2, wherein the at least one memory and the computer program code are further configured, with the at least one processor, to cause the apparatus at least to dynamically or semi-statically signal, to the at least one UE, information relating to a total number of layers.

4. The apparatus according to claim 2, wherein the at least one memory and the computer program code are further configured, with the at least one processor, to cause the apparatus at least to dynamically or semi-statically signal, to the at least one UE, information relating to utilized demodulation reference signal (DMRS) configuration for serving transmission.

5. The apparatus according to claim 2, wherein the at least one memory and the computer program code are further configured, with the at least one processor, to cause the apparatus at least to signal an exact or a subset of DMRS configuration used for co-scheduled transmission.

6. The apparatus according to claim 1, wherein the apparatus comprises an evolved node B (eNB).

7. A method, comprising:
   reporting to a network node, by a user equipment, channel state information (CSI) feedback; and
   receiving at least one of scheduling of the user equipment in more than one rank in a subframe or scheduling of the user equipment at least one same time-frequency resource with multiple spatial layers as scheduled to another user equipment, wherein
   each of the user equipment and said another user equipment are scheduled on a different spatial layer of the multiple spatial layers, and
   the user equipment or said another user equipment is scheduled on more than one spatial layer of the multiple spatial layers.

8. The method according to claim 7, further comprising:
   receiving network assistance with respect to interference properties due to co-scheduled user equipment; and
   receiving dynamic signaling indicating at least one of serving and interference properties.

9. The method according to claim 8, wherein, when an interferer is in cell-specific reference signal (CRS) mode, the network assistance information comprises at least one of: codebook subset restriction indicating an active UE in the cell is utilizing precoding matrix indicator (PMI) from signaled subset of precoding matrix indicators (PMIs), power allocation subset of used power allocations within subframe layer, or transmission scheme/mode.

10. The method according to claim 8, wherein, when an interferer is in demodulation reference signal (DMRS) mode, the network assistance comprises at least one of: a subset of demodulation reference signal (DMRS) configurations, virtual cell ID, quasi-collocation information, or transmission scheme/mode.

11. The method according to claim 8, wherein, when an interferer is in cell-specific reference signal (CRS) mode, the dynamic signaling comprises an exact wideband precoding matrix indicator (PMI) of a serving transmission with an indication which column of the precoding matrix indicator (PMI) corresponds to a layer to be blindly detected.

12. The method according to claim 8, wherein, when an interferer is in demodulation reference signal (DMRS) mode, the dynamic signaling comprises allocated demodulation reference signal (DMRS) configuration(s) including an indication on which demodulation reference signal (DMRS) configuration(s) the user equipment will detect presence of layers targeted for blind detection.

13. The method according to claim 7, further comprising receiving information relating to blind detection needed for co-scheduled interference physical downlink shared channel (PDSCH) detection.

14. An apparatus, comprising:
    at least one processor; and
    at least one memory including computer program code,
    wherein the at least one memory and computer program code are configured, with the at least one processor, to cause the apparatus at least to
    report, to a network node, channel state information (CSI) feedback; and
    receive at least one of scheduling of the apparatus in more than one rank in a subframe or scheduling of the apparatus at least one same time-frequency resource with multiple spatial layers as scheduled to another user equipment, wherein
    each of the apparatus and said another user equipment are scheduled on a different spatial layer of the multiple spatial layers, and
    the apparatus or said another user equipment is scheduled on more than one spatial layer of the multiple spatial layers.

15. The apparatus according to claim 14, wherein the at least one memory and computer program code are further configured, with the at least one processor, to cause the apparatus at least to receive network assistance with respect to interference properties due to co-scheduled user equipment; and receive dynamic signaling indicating at least one of serving and interference properties.

16. The apparatus according to claim 15, wherein, when an interferer is in cell-specific reference signal (CRS) mode, the network assistance comprises at least one of: codebook subset restriction indicating an active UE in the cell is utilizing precoding matrix indicator (PMI) from signaled subset of precoding matrix indicators (PMIs), power allocation subset of used power allocations within subframe layer, or transmission scheme/mode.

17. The apparatus according to claim 15, wherein, when an interferer is in demodulation reference signal (DMRS) mode, the network assistance comprises at least one of: a subset of demodulation reference signal (DMRS) configurations, virtual cell ID, quasi-collocation information, or transmission scheme/mode.

18. The apparatus according to claim 15, wherein, when an interferer is in cell-specific reference signal (CRS) mode, the dynamic signaling comprises an exact wideband precoding matrix indicator (PMI) of a serving transmission with an indication which column of the precoding matrix indicator (PMI) corresponds to a layer to be blindly detected.

19. The apparatus according to claim 15, wherein, when an interferer is in demodulation reference signal (DMRS) mode, the dynamic signaling comprises allocated demodulation reference signal (DMRS) configuration(s) including an indication on which demodulation reference signal (DMRS) configuration(s) the user equipment will detect presence of layers targeted for blind detection.

20. The apparatus according to claim 14, wherein the at least one memory and computer program code are further configured, with the at least one processor, to cause the apparatus at least to receive information relating to blind detection needed for co-scheduled interference physical downlink shared channel (PDSCH) detection.

* * * * *